Sept. 11, 1945.　　　L. V. KINGSBURY　　　2,384,623
POWER LIFT AND POWER DRIVEN IMPLEMENT
Filed March 8, 1943　　　2 Sheets-Sheet 1
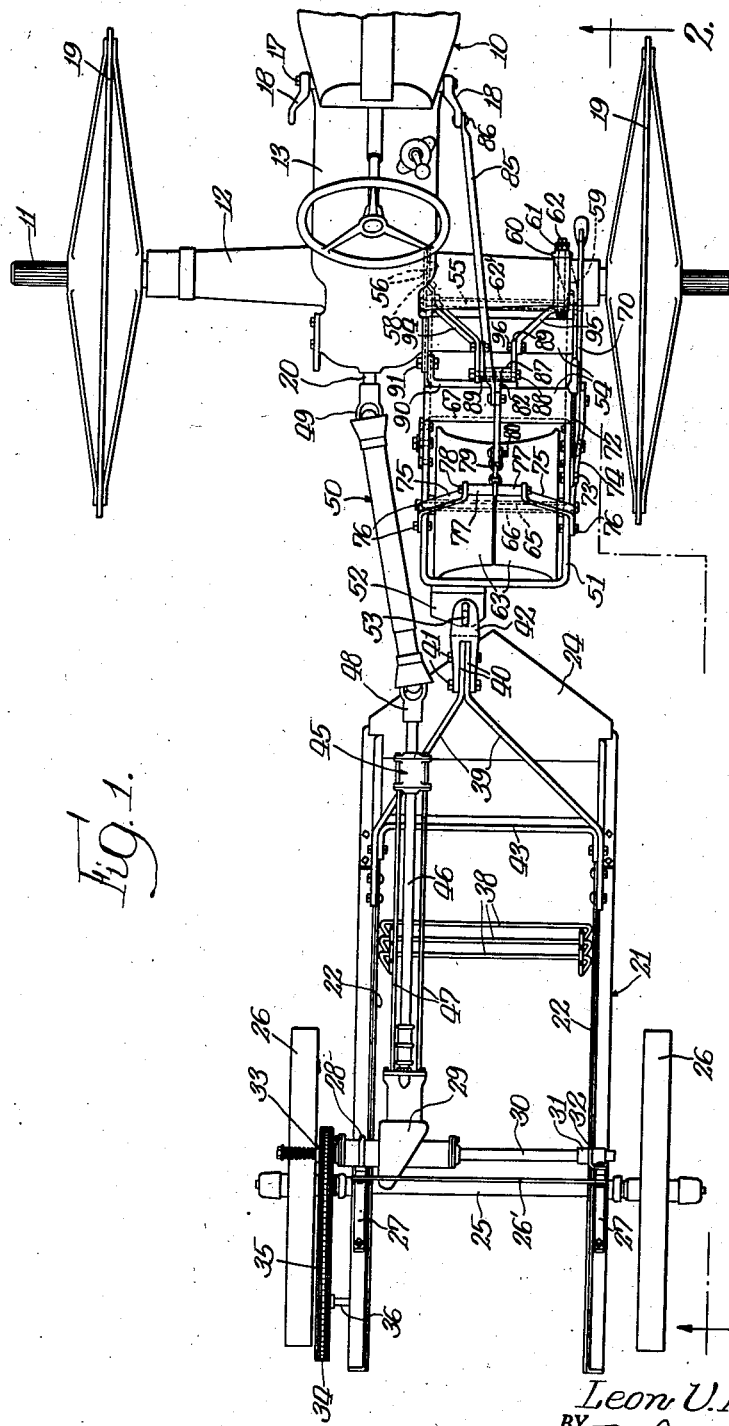
INVENTOR.
Leon V. Kingsbury
BY John P. Smith
Atty.

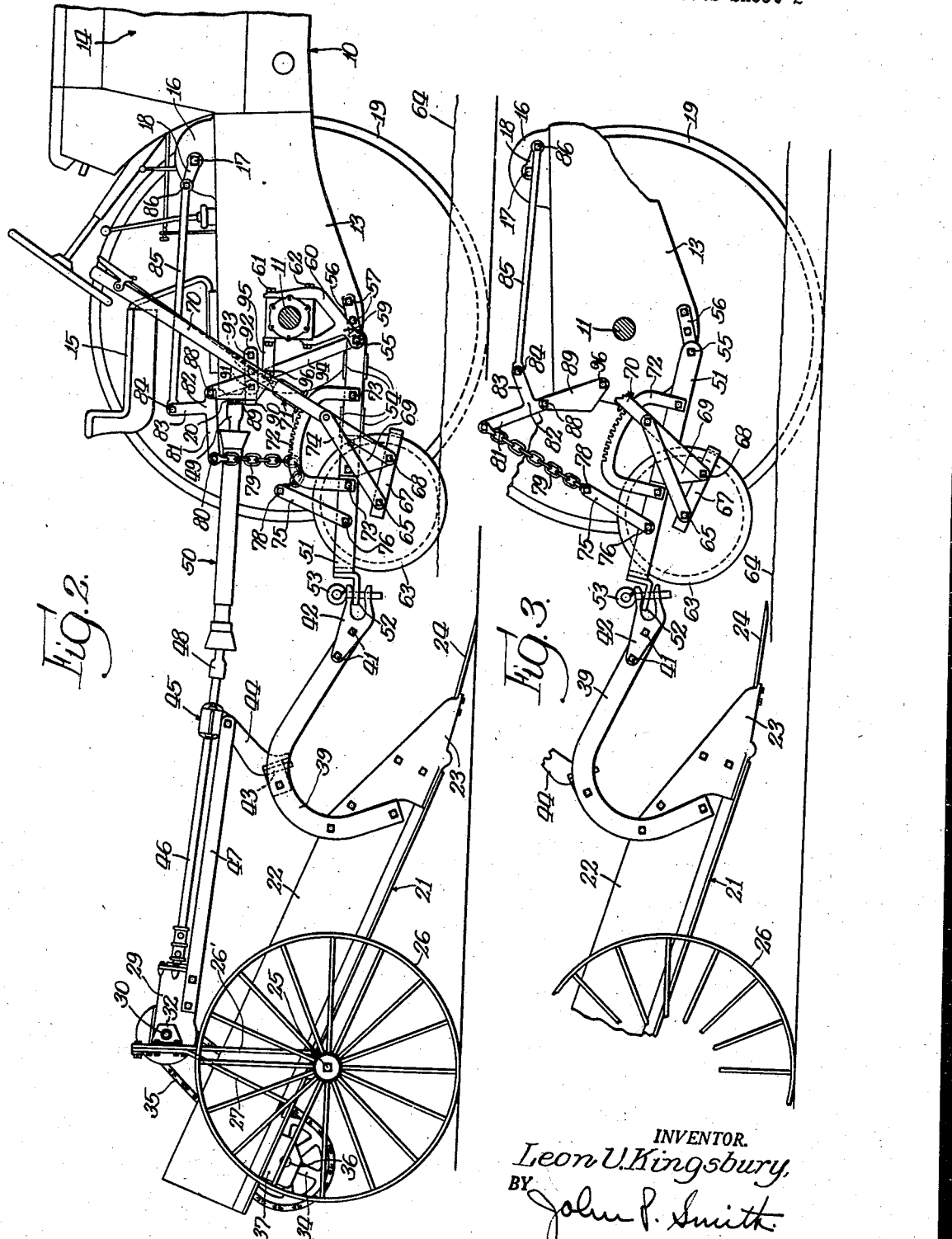

Patented Sept. 11, 1945

2,384,623

UNITED STATES PATENT OFFICE 2,384,623

POWER LIFT AND POWER-DRIVEN IMPLEMENT

Leon V. Kingsbury, South Bend, Ind., assignor to The Oliver Corporation, a corporation of Delaware Application March 8, 1943, Serial No. 478,446

12 Claims. (Cl. 55—51)

The present invention relates generally to agricultural implements, but more particularly to that type of implement attached to and drawn by a tractor in which the power take-off shaft of the tractor is operatively connected for driving certain movable elements of the implement and the power lift mechanism of the tractor is employed for raising and lowering certain operative parts of the attached implement and arranged so that the same may be controlled from the operator's seat on the tractor.

Another object of the invention is to provide a novel and improved potato digger of one or more row type in combination with a tractor in which the power take-off shaft and power lift mechanism of the tractor is operatively connected with the implement for driving the movable elements thereof and for raising and lowering certain operative parts of the implement, together with certain manual adjustments and controls which are all located within easy reach of the operator on the tractor.

A further object of the invention is to provide a novel form of forecarriage or truck in which its associated frame is pivoted to the tractor for attaching the implements thereto and operatively connected to the power lift of the tractor for raising and lowering the implement and having manually controlled means thereon, operable from the seat of the tractor for regulating the depth penetration of the ground engaging tool of the implement.

A still further object of the invention is to provide a novel and improved tractor drawn potato digger in which the power take-off mechanism of the tractor is used for driving the movable elements of the digger and the power lift of the tractor is employed for raising and lowering the forward end of the digger with respect to the ground. This arrangement permits the power of the tractor to drive the movable elements of the potato digger for freeing the same from straw and trash while in standing position.

These and other objects are accomplished by providing a construction and an arrangement of the various parts in the manner hereinafter described and particularly pointed out in the appended claims.

Referring to the drawings:

Fig. 1 is a top plan view showing a fragmentary portion of the tractor and the manner in which the implements drawn thereby are operatively connected thereto;

Fig. 2 is a vertical cross sectional view taken on the line 2—2 in Fig. 1 and showing the implement in ground engaging position; and Fig. 3 is a fragmentary cross sectional view similar to that shown in Fig. 2 illustrating the manner as well as the position of the parts when the implement has been raised or in non-operative position.

In illustrating one form of my invention I have shown, the same in connection with a conventional form of tractor, a fragmentary portion of which is shown in the drawings, which comprises a main frame generally indicated by the reference character 10. The tractor in this instance has its rear end supported on an axle 11 journaled within the rear axle housing 12. The main frame 10 of the tractor also includes a transmission housing which may be formed integrally with or separate from the rear axle housing 12. The tractor shown is provided with the usual internal combustion engine or motor, generally indicated by the reference character 14. Mounted on the housing 13 is the usual tractor operator's seat 15. Operatively connected with the transmission mechanism of the tractor in a manner well understood in the art, is a power lift mechanism located within the housing 16. This power lift mechanism may be of any preferred construction, but consists primarily of a worm wheel, worm gear, half revolution clutch of a construction similar to the construction disclosed in the H. E. Altgelt Patent No. 2,059,676, dated November 9, 1936. For that reason it is believed that a more specific description of this mechanism is not necessary. This power lift mechanism includes an operatively driven and intermittently rotated transverse shaft 17, to the opposite ends of which are connected power lift cranks 18. The rear end of the tractor is supported on traction wheels 19, which in turn, are keyed or splined to the opposite ends of the axle 11. Also operatively connected to the transmission mechanism of the tractor and driven by the engine thereof is the usual power take-off shaft 20.

For the purpose of illustration, I have shown the implement in this instance as comprising a single row potato digger, which includes a main frame or bed generally indicated by the reference character 21. The main frame or bed 21 has the usual vertically spaced apart forwardly inclined side walls 22. Secured to the forward end of the main frame 21 through the medium of triangular brackets or plates 23 is a digger blade 24. The rear end of the digger frame is supported on a transverse axle 25 and supporting wheels 26. The side walls 22 of the frame members of the potato-digger are reinforced by an inverted U-shaped transverse frame member 26'. This frame member 26' is reinforced by two oppositely disposed and diagonally extending brace members 27. Secured to one leg of the inverted U-shaped member 26' by a U bolt 28 is a gear housing 29. Extending transversely through the gear housing 29 and journaled therein is a shaft 30. One end of the shaft 30 is journaled in the bearing sleeve 31 carried by a bracket 32, which in turn, is secured to the other vertical leg of the inverted U-shaped member 26'. (See Figs. 1 and 2 of the drawings.) Secured to one end of the shaft 30 adjacent the gear housing is a sprocket wheel 33 which operatively drives a driven sprocket wheel 34 through the medium of a chain 35. The sprocket wheel 35 is secured to a transverse shaft 36, which in turn, is journaled in the vertically extending side plate 37 secured to the opposite frame members of the main frame 21. Secured adjacent the opposite ends of the shaft 36 within the side wall 22 are sprocket wheels (not shown) over which a conveyor and elevator belt 38 travels in a manner well understood in the art for conveying, elevating and separating the dirt from the potatoes as they are conveyed rearwardly. The construction of the potato digger thus far described is conventional in form and for that reason it is believed more details as to the operative structure is not necessary.

Secured to the forward ends of the opposite side walls 22 of the potato digger are curved or goosenecked shaped beams 39 which converge forwardly and have their forward ends contacting and extending in parallelism as shown at 40. Embracing the forward ends 40 and secured thereto by means of bolts 41 is a draft clevis 42. An intermediate portion of the beams 39 are reinforced by transverse bar 43. Secured to in any well known manner and extending upwardly from adjacent one end of the transverse bar 43 is a bracket 44. Mounted in the upper end of the bracket 44 and secured thereto, is a bearing bushing generally indicated by the reference character 45. Journaled in the bearing bushing 45 and in the gear housing 29 is a longitudinally extending shaft 46. The gear housing 29 is held in rigid spaced relation with respect to the bushing 45 by the two longitudinally extending bars 47. The rear end of the shaft 46 is connected to a bevel gear (not shown) which in turn, drives the complementary bevelled gear (not shown) secured to the shaft 30 for operatively driving the elevating and conveying chain 38. The forward end of the shaft 46 is connected by means of two universal connections 48 and 49 and a telescoping connection within the safety shield or tubular member generally indicated by the reference character 50 to the power take-off shaft 20 of the tractor.

My improved construction of forecarriage and draft frame includes a U-shaped frame member 51 which has an apertured draft bracket 52 welded to one side of the center thereof for attaching a draft clevis 42 thereto by means of a pin 53. The forward ends of the draft member 51 are rigidly held spaced apart by four transverse bars, as shown at 54, which have their opposite ends welded to upper and lower edges of the U-shaped member 51. The forward ends of the forecarriage or draft frame 51 are pivoted on a transverse bolt 55, one end of which is supported on two straps 56 bolted to the transmission housing 13 of the tractor by means of bolts 57. The rearward ends of these straps 56 are spaced apart as shown at 58 so as to receive therebetween one of the ends of the frame member 51. The other end of the transverse bolt 55 is supported in a laterally offset arm 59 of the bracket 60. The bracket 60 is secured to the axle housing 12 of the tractor by means of bolts 61 and 62. Embracing the bolt 55 between the outer strap 56 and the arm 59 is a spacer tube or pipe 62'. Adjustably supported on the U-shaped draft and forecarriage frame 51 are depth gauge or forecarriage wheels 63 in the form of a drum which are adapted to ride the ridge or hill 64 for regulating and controlling the depth penetration of the blade 24 of the potato digger. The wheels 63 are journaled on a bolt or shaft 65 and spacer tube or pipe 66, which in turn, is carried in the rear end of the arms of a U-shaped member 67. The opposite arms of the U-shaped member 67 are pivoted as shown at 68 to opposite triangular plates 69, which in turn, are secured to the longitudinally extending portions of the truck or draft frame 51. Pivoted on one end of the bolt 68 is an upwardly extending, manually adjustable lever 70 located within easy reach of the operator's seat 15 on the tractor. This lever is provided with the usual detent mechanism generally indicated by the reference character 71 for engaging an arcuate sector 72 for locking the lever in various positions of adjustment, thereby regulating the adjustment of the wheels 63 with respect to the frame 51 for gauging or regulating the depth penetration of the digger blade 24. The sector 72 is secured to one side of the frame member 51 by bolts 73. The lower end of the lever 70 is braced with respect to the U-shaped members 67 by diagonal brace 74. The forecarriage or draft frame, together with the adjustable wheels 63 is raised and lowered through the power lift of the tractor and this mechanism includes two upwardly converging links 75, which have their lower ends pivotally connected as shown at 76, to the opposite sides of the frame member 51. The upper ends of the links 75 are secured together and held in spaced relation with respect to one another by means of two spacer tubes 77 and bolt 78. Connected between the inner ends of the tube 77 and directly to the bolt 78 is a chain 79. The upper end of the chain 79 is connected, as shown at 80, to the rear end of an arm 81 of a bell-crank member 82. The bell-crank member has a second arm 83 located at right angles with respect to the first arm 81. Connected to the outer end of the arm 83 as shown at 84, is a connecting rod 85 which has its forward end as shown at 86, connected to one of the power lift cranks 18 of the power lift mechanism of the tractor. The bell-crank lever 82 has a transverse bearing barrel 87 which is pivoted on a bolt 88. The bearing bolt 88 is supported on two spaced apart triangular plates 89. The triangular plates 89 are supported on the tractor by means of right angularly shaped bracket 90 which has its transverse portion welded to the forward edges of the spaced apart plates 89 and its inner end secured by means of a bolt 91 to a strap 92 secured by means of bolts 93 to the tractor housing 13. The inner triangular plate 89 is reinforced and further supported by diagonal brace 94 which has its upper end connected to the bolt 88 and its lower end connected to the pivot bolt 55. The outer triangular plate 89 is also reinforced and supported by an angularly disposed brace 95 which has one end connected to the bolt 61 of the axle housing 12 and the other end connected by means of a bolt 96 to the lower end of said plate.

From the above description it will be obvious that should the operator desire to regulate the depth penetration of the digger blade 24 of the potato digger, the manually adjustable lever 70 from the operator's seat on the tractor may be actuated in a direction to depress or raise the gauge wheel 63 with respect to the draft or forecarriage frame 51 and thereby control the extent to which the blade 24 may enter the ground. It will also be obvious that should the operator desire to raise the digger blade out of the ground from the position shown in Fig. 2 to that shown in Fig. 3 for transporting purpose or for the purpose of turning at the end of the field, the trip of the power lift mechanism 15 on the tractor is actuated to thereby cause the power lift crank 18 to revolve one-half revolution, thereby actuating the bell-crank 82 through the connection 85 from the position shown in Fig. 2 of the drawings to that shown in Fig. 3. When the bell-crank is actuated to the position shown in Fig. 3 of the drawings, it will in turn, elevate the draft or forecarriage frame 51, thereby lifting the forward end of the potato digger or blade out of the ground.

In connection with the operation of my improved power drive and power lift digger, it will be noted that the tractor wheels 19 of the tractor are arranged to straddle two rows of potatoes, while the trailing potato digger and particularly the wheels 26 thereof, are adapted to straddle a single row and the position of the power lift draft frame 51 is so arranged with the power take-off shaft 20 of the tractor so as to keep the line of drive of the power take-off shaft for driving the movable elements for elevating and conveying the chain 38 in substantial longitudinal alignment so as to reduce to a minimum the angular displacement of the shaft and universal joint when the tractor is making a turn.

It will be observed that the lever 70 together with the detent mechanism 72 and the gauge wheel 63 may be eliminated from the construction shown in the drawings so that the draft or forecarriage frame 51 is wholly supported by the chain suspended from the bell-crank 81. The depth adjustments may be made for controlling the depth penetration of the digger blade 24 by lengthening or shortening the chain 79. Under such an arrangement, of course, it will be understood that the other parts will function in their usual manner.

Summarizing the advantages and novel features of operation, it will be noted that by utilizing the power take-off shaft of the tractor as well as the power lift of the tractor in connection with performing these functions on the implement attached to and drawn at the rear of the tractor, a considerable simplification and reduction of parts is accomplished over the arrangement where these mechanisms are directly on the implement itself. It is further pointed out that by providing a special draft frame pivoted to the tractor and having incorporated therein a gauge wheel which can be manually adjusted from the operator's seat on the tractor, affords a simple means of controlling the depth control of the digger blade and in addition thereto, affords a simple arrangement for utilizing the conventional power lift of the tractor to raise and lower the implement from non-working position to working position or vice versa by the power of the tractor.

While in the above specification I have described one embodiment which my invention may assume in practice, it will of course, be understood that modification may be made without departing from the spirit and scope of the invention as expressed in the following claims.

What I claim as my invention and desire to secure by Letters Patent is:

1. The combination with a tractor and a wheel supported agricultural implement connected therewith, a forecarriage frame for supporting the forward end of said implement and forming the draft connection between said implement and tractor, means for pivotally connecting said implement to said frame for vertical and lateral movement with respect to said tractor, an adjustable gauge wheel carried by said forecarriage frame for gauging the forward end of said implement with respect to the ground, and a power lift mechanism mounted on said tractor and operatively connected to said forecarriage for raising and lowering the forward end of said implement.

2. The combination with a tractor and a wheel supported agricultural implement connected therewith, a draft frame pivoted to said tractor and said implement for forming the connection therebetween, means for pivotally connecting said implement to said frame for vertical and lateral movement with respect to said tractor, a gauge wheel carried by said draft frame, means for adjusting said gauge wheel with respect to said draft frame from the operator's seat on the tractor, and a power lift mechanism mounted on said tractor and operatively connected to said draft frame for raising and lowering the forward end of said implement.

3. The combination with a tractor and an agricultural implement having a main frame, a ground engaging tool carried by said main frame, a movable element carried by said frame, a power take-off mounted on said tractor and operatively connected with said movable element for driving the same, a draft frame pivoted to said tractor and to said implement for forming the connection therebetween, a gauge wheel pivoted to said draft frame, a manually operable lever mounted on said draft frame within easy reach of the operator's seat on said tractor for adjusting said wheel with respect to said frame, and a power lift mechanism mounted on said tractor and operatively connected to said draft frame for raising and lowering the forward end of said implement.

4. The combination with a tractor and a trailing agricultural implement having a main frame, a ground engaging tool carried by said main frame, movable elements carried by said main frame, a power take-off mounted on said tractor and operatively connected with said movable elements, a draft frame forming the connection between said implement and said tractor, said draft frame being pivoted to said tractor and said implement a gauge wheel pivoted to said draft frame and adjustable with respect thereto for regulating the depth penetration of said tool, and a power lift mechanism mounted on said tractor and operatively connected to said draft frame for raising or lowering said tool with respect to the ground.

5. The combination with a tractor and a trailing agricultural implement having a main frame, ground wheels for supporting said main frame a ground engaging tool carried by said main frame, movable elements carried by said main frame, a power take-off mounted on said tractor and operatively connected with said movable elements, a draft frame pivotally connected to said implement and pivotally connected to said tractor, a gauge wheel pivoted to said draft frame and adjustable with respect thereto for regulating the depth penetration of said tool, a power lift mechanism including a bell crank mounted on said tractor, and a flexible connection between said bell crank and said draft frame for raising and lowering said tool with respect to the ground.

6. The combination with a tractor and a trailing potato digger having a main frame, a movable elevator and conveying chain mounted on said main frame, a digger blade mounted in the forward end of said main frame, a power take-off shaft extending from said tractor and geared to said conveying chain for driving same, a forecarriage frame pivoted to and on one side of the longitudinal center line of said tractor, said forecarriage frame forming the connection between said main frame and said tractor, a manually adjustable gauge wheel pivoted on said forecarriage frame, and a power lift mechanism mounted on and driven by said tractor and operatively connected to said forecarriage frame for raising and lowering said blade with respect to the ground.

7. The combination with a tractor and a trailing potato digger having a main frame, a movable elevator and conveying chain mounted on said main frame, a digger blade mounted in the forward end of said main frame, a power take-off shaft extending from said tractor and geared to said conveying chain for driving same, a forecarriage frame pivoted to and on one side of the longitudinal center line of said tractor, said forecarriage frame forming the connection between said main frame and said tractor, a manually adjustable gauge wheel pivoted on said forecarriage frame, a hand lever pivoted on said forecarriage frame and extending within easy reach of the operator's seat on the tractor for controlling the position of said gauge wheel with respect to said forecarriage frame, and a power lift mechanism mounted on and driven by said tractor and operatively connected to said forecarriage frame for raising and lowering said blade with respect to the ground.

8. The combination with a tractor and a trailing potato digger having a main frame, wheels supporting the rear end of said frame, a movable elevator and conveyor chain mounted on said main frame, a digger blade mounted in the forward end of said frame, a power take off shaft extending from said tractor and geared to said conveyor chain, said power take-off shaft extending in a substantial longitudinal line, a U-shaped forecarriage frame pivoted to and on one side of the longitudinal center line of said tractor, the forward end of said main frame being pivotally supported on and located to one side of said forecarriage frame, a power lift mechanism mounted on and driven by said tractor, said power lift being operatively connected to said forecarriage frame for raising and lowering said blade with respect to the ground.

9. The combination with a tractor and a wheel supported trailing agricultural implement having a main frame, a ground engaging tool carried by said main frame forward of said wheel support, a movable element carried by said main frame, a power take-off mounted on said tractor and operatively connected to said movable element for driving the same, a draft frame forming the connection between said implement and said tractor, said draft frame being pivotally connected to said tractor and pivotally connected to said implement, and a power lift mechanism mounted on said tractor and connected to said draft frame for raising and lowering the forward end of said implement.

10. The combination with a tractor and a wheel supported agricultural implement having a main frame, a ground engaging tool carried by said main frame forward of said wheel support, a movable element carried by said main frame, a power take-off mounted on said tractor and operatively connected to said movable element for driving the same, a draft frame pivoted to said tractor on a horizontal pivot for vertical swinging movement, said implement being pivoted to said draft frame for lateral and vertical movement with respect thereto, and a power lift mounted on said tractor and connected to said draft frame for raising and lowering said ground engaging tool.

11. The combination with a tractor and a trailing potato digger having a main frame, a movable elevator and conveying chain mounted on said main frame, a digger blade mounted on the forward end of said main frame, a power take-off shaft extending from said tractor and geared to said conveying chain for driving the same, a forecarriage frame pivoted to said tractor, said forecarriage frame forming the connection between said main frame and said tractor, a manually adjustable gauge wheel pivoted to said forecarriage frame, and a power lift mechanism mounted on and driven by said tractor and operatively connected to said forecarriage frame for raising and lowering said blade with respect to the ground.

12. The combination with a tractor and a wheel supported agricultural implement connected therewith, a forecarriage frame pivoted to said tractor, means for pivotally connecting the forward end of said implement to said frame for vertical and lateral movement with respect to said tractor, and a power lift mechanism mounted on said tractor and operatively connected to said forecarriage for raising and lowering the forward end of said implement.

LEON V. KINGSBURY.